No. 662,026. Patented Nov. 20, 1900.
R. B. ROBERTSON.
POWER DEVICE FOR ROAD VEHICLES.
(Application filed June 1, 1899.)
(No Model.)

Witnesses:
V. E. Rouse
Francis D. Pastorius

Inventor:
Robert B. Robertson
by
G. B. Price
Atty.

UNITED STATES PATENT OFFICE.

ROBERT B. ROBERTSON, OF TOPEKA, KANSAS.

POWER DEVICE FOR ROAD-VEHICLES.

SPECIFICATION forming part of Letters Patent No. 662,026, dated November 20, 1900.

Application filed June 1, 1899. Serial No. 718,972. (No model.)

*To all whom it may concern:*

Be it known that I, ROBERT B. ROBERTSON, a citizen of the United States, residing at Topeka, in the county of Shawnee and State of Kansas, have invented a new and useful Device for Applying Power to Vehicles, of which the following is a specification.

My invention consists in a method of applying power to the wheels of vehicles for the purpose of propelling them, and while applicable to all kinds of self-propelled vehicles, is especially adapted to horseless carriages and wagons, a point of considerable advantage possessed by my method over all others being that any ordinary carriage or wagon can be readily converted into a self-propelled vehicle by the addition of the few parts comprising my invention.

Figure 1:
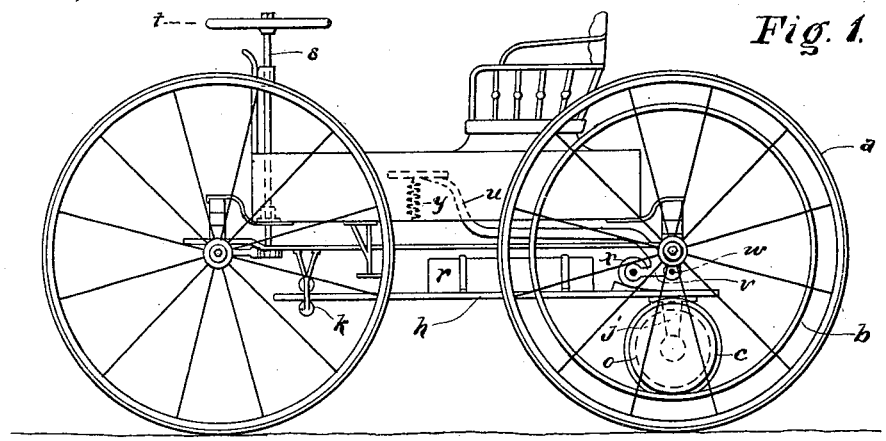
Figure 2:
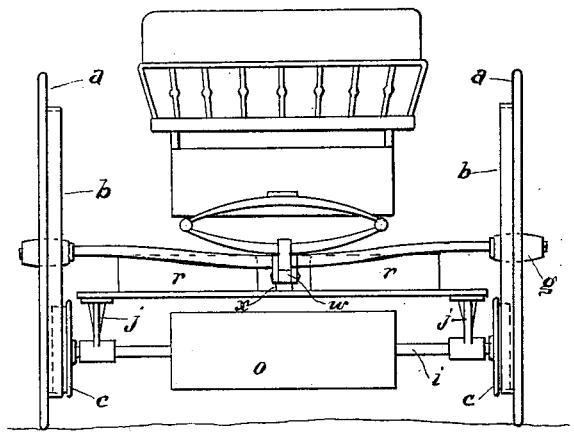
Figure 3:
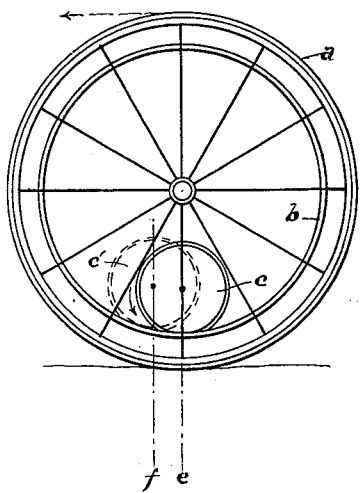

Referring to the drawings, Figure 1 shows a side elevation view of an ordinary type of runabout carriage with my propelling device attached. Fig. 2 shows a back end view of the same. Fig. 3 shows the chief elements of my invention and illustrates the method by which I cause rotation.

Referring first to Fig. 3, let $a$ represent an ordinary buggy-wheel, to the spokes of which is fastened, on the inside of the wheel, a concentric track or flange $b$, on the inner circumference of which rolls the small wheel $c$, the lateral faces of which are seen in end view in Fig. 2, being distinguished by the same letters. Now it will be seen that if the small wheel $c$ is caused by some method to revolve in the direction of the curved arrow it will immediately tend to mount the incline of the circular track $b$ to a position $c'$, which will shift the center of gravity of the wheels $a$ and $c$ from a normal vertical $e$ toward the vertical $f$, which by a well-known law will roll the wheel $a$ forward in the direction of the straight arrow, the effect being to propel the vehicle to which the wheel is attached at its ordinary hub $g$. It is also seen that even if the wheel $c$ were prevented from mounting the circular track $b$, but maintained its center on the vertical $e$ of the hub $g$, it could still be made to rotate the wheel $a$ either through the touching peripheries of $b$ and $c$ meshing together in cog-teeth or by sufficient rolling friction between their smooth surfaces so in contact.

Referring now to Figs. 1 and 2 and the same letters, the application of this method of propelling to the hind wheels of a carriage will be apparent. In these views, $h$ is a platform suspended under the carriage-body at the back end through the hangers $j$, shaft $i$, and small wheels $c\ c$, the latter resting on and within the circular track $b\ b$, attached to the spokes of both rear wheels, the front end of platform $h$ being carried by the support $k$, attached to the carriage-frame. Rotative power is supplied to this shaft $i$ by a motor which when practicable is carried on the shaft itself, as at $o$, or the motor may be attached elsewhere to the platform $h$ and its power conveyed to the shaft $i$ through suitable connecting-rods or gearing. This motor $o$ may be of any appropriate device or kind—as electric, steam, air, or gasolene—the necessary storage battery, boiler, or reservoir being carried either above or below the platform $h$ and here represented at $r$.

To propel the vehicle, it is only necessary to start the motor $o$, when its power is transmitted through the wheels $c$ in contact with the circular track $b$, the wheels $c$ immediately tending to mount to $c'$, as described in Fig. 3, and compelling the buggy-wheels $a$ to revolve. This mounting of the wheels $c$ toward position $c'$, thereby shifting the center of gravity of pressure forward to $c'$, aids the wheel $a$ very materially in climbing grades. The carriage is guided by any steering device, as through a hand-wheel $t$ and shaft $s$, meshing through suitable intermediates to the front axle.

When the weight of the motor and machinery is not sufficient in itself to produce the necessary frictional contact between the wheels $c$ and their track $b$, it may be increased by bringing to bear some of the weight of the vehicle-body and its occupant through some such mechanical medium as the lever-arms $u\ v$, shown fulcrumed at $w$ to an attachment of the back axle and carrying the small roller $x$, which bears upon the platform $h$. It will be seen that pressure of the occupant's foot upon the arm $u$ will be conveyed through the roller $x$ to the platform $h$, thereby increasing the friction between the wheels $c$ and tracks $b$, or a similar effect may be more constantly applied by confining the lever-arm $u$ to the vehicle-body itself through the medium of a spring in tension, as at $y$.

What I claim as new and original, and desire to secure by Letters Patent, is—

1. In a self-propelled vehicle a detachable frame or platform suspended beneath the vehicle-body and carrying attached thereto a motor, reservoir, hangers, shaft or shafts, and power-wheels; said power-wheels bearing directly upon and imparting rotation to the wheels of said vehicle; substantially as shown.

2. In a self-propelled vehicle a detachable, swinging platform or frame hung beneath the vehicle-body and carrying attached thereto a power equipment; said platform being supported at one end by links or roller-bearings hung to the vehicle body or frame and at the other end by wheels in contact with a circular flange or track fastened to the spokes or faces of the opposite wheels of said vehicle; substantially as shown.

3. In a self-propelled vehicle a lever arm or arms fulcrumed from an axle of said vehicle and carrying one or more rollers bearing upon a movable platform beneath the vehicle-body, the weight end of said lever rising above or within the vehicle-body and being free or attached by spring to the vehicle-body; substantially as shown.

ROBERT B. ROBERTSON.

Witnesses:
V. E. ROUSE,
FRANCIS D. PASTORIUS.